(12) United States Patent        (10) Patent No.:     US 12,148,304 B2
     Han et al.                  (45) Date of Patent:      Nov. 19, 2024

(54) VEHICLE POSITIONING METHOD AND APPARATUS, ELECTRONIC DEVICE AND STORAGE MEDIUM

(71) Applicant: UISEE (SHANGHAI) AUTOMOTIVE TECHNOLOGIES LTD., Shanghai (CN)

(72) Inventors: Zuoyue Han, Shanghai (CN); Zihan Wang, Shanghai (CN)

(73) Assignee: UISEE (SHANGHAI) AUTOMOTIVE TECHNOLOGIES LTD., Shanghai (CN)

( * ) Notice: Subject to any disclaimer, the term of this patent is extended or adjusted under 35 U.S.C. 154(b) by 0 days.

(21) Appl. No.: 18/574,048

(22) PCT Filed: Jun. 1, 2022

(86) PCT No.: PCT/CN2022/096647
 § 371 (c)(1),
 (2) Date: Dec. 25, 2023

(87) PCT Pub. No.: WO2023/273780
 PCT Pub. Date: Jan. 5, 2023

(65) Prior Publication Data
 US 2024/0265811 A1    Aug. 8, 2024

(30) Foreign Application Priority Data
 Jun. 28, 2021  (CN) .......................... 202110720086.5

(51) Int. Cl.
 *G06V 20/56*  (2022.01)
 *G01C 21/30*  (2006.01)
 *G08G 1/16*   (2006.01)

(52) U.S. Cl.
 CPC ............. *G08G 1/167* (2013.01); *G01C 21/30* (2013.01); *G06V 20/588* (2022.01)

(58) Field of Classification Search
 CPC ...... G08G 1/167; G01C 21/30; G06V 20/588; B60W 2552/10
 See application file for complete search history.

(56) References Cited

U.S. PATENT DOCUMENTS

| | | | |
|---|---|---|---|
| 2010/0246889 A1* | 9/2010 | Nara | G06V 20/588 382/104 |
| 2012/0209518 A1* | 8/2012 | Nowak | G06T 15/40 701/445 |

(Continued)

FOREIGN PATENT DOCUMENTS

| | | |
|---|---|---|
| CN | 105374212 A | 3/2016 |
| CN | 110155053 A | 8/2019 |

(Continued)

*Primary Examiner* — Kenneth J Malkowski
(74) *Attorney, Agent, or Firm* — Bayramoglu Law Offices LLC

(57) ABSTRACT

A vehicle positioning method and apparatus, an electronic device, and a storage medium are provided. The method comprises: determining a current positioning-established lane on the basis of current position information of a vehicle, road information sensed by the vehicle and map information; comparing the road information sensed by the vehicle acquired in real time with the current positioning-established lane to determine a mismatch integral value; and after determining that the mismatch integral value is greater than or equal to a preset integral value, returning to execute the step of determining the current positioning-established lane on the basis of the current position information of the vehicle, the road information sensed by the vehicle and map information.

20 Claims, 8 Drawing Sheets

(56) References Cited

U.S. PATENT DOCUMENTS

| | | | |
|---|---|---|---|
| 2014/0063251 A1 | 3/2014 | Kim et al. | |
| 2014/0278052 A1* | 9/2014 | Slavin | G01C 21/3492 |
| | | | 701/400 |
| 2018/0345960 A1 | 12/2018 | Fujii | |
| 2020/0003567 A1* | 1/2020 | Minamiguchi | G01C 21/3446 |
| 2020/0249048 A1* | 8/2020 | Qi | G08G 1/0967 |
| 2020/0361489 A1 | 11/2020 | Park et al. | |
| 2021/0046929 A1 | 2/2021 | Wu | |
| 2021/0078580 A1 | 3/2021 | Mangal et al. | |
| 2022/0019817 A1* | 1/2022 | Li | B60W 30/12 |
| 2023/0278563 A1* | 9/2023 | Xiao | B60W 40/06 |
| | | | 701/1 |

FOREIGN PATENT DOCUMENTS

| | | |
|---|---|---|
| CN | 110688920 A | 1/2020 |
| CN | 110979346 A | 4/2020 |
| CN | 111380539 A | 7/2020 |
| CN | 111507129 A | 8/2020 |
| CN | 112415552 A | 2/2021 |
| CN | 112622903 A | 4/2021 |
| CN | 112639907 A | 4/2021 |
| CN | 113232658 A | 8/2021 |
| EP | 0936517 A2 | 8/1999 |
| EP | 1503354 A1 | 2/2005 |
| KR | 20120081771 A | 7/2012 |
| KR | 20190061137 A | 6/2019 |
| KR | 20190097453 A | 8/2019 |
| WO | 2020193438 A1 | 10/2020 |

* cited by examiner

VEHICLE POSITIONING METHOD AND APPARATUS, ELECTRONIC DEVICE AND STORAGE MEDIUM

CROSS-REFERENCE TO THE RELATED APPLICATIONS

This application is the national phase entry of International Application No. PCT/CN2022/096647, filed on Jun. 1, 2022, which is based upon and claims priority to Chinese Patent Application No. 202110720086.5, filed on Jun. 28, 2021, the entire contents of which are incorporated herein by reference.

TECHNICAL FIELD

Embodiments of the present disclosure relate to the technical field of trailers, and in particular, to a vehicle positioning method and apparatus, an electronic device, and a storage medium.

BACKGROUND

Autonomous vehicles can reduce traffic congestion, improve traffic efficiency, release both hands and improve social productivity, and therefore, related arts of the autonomous vehicles are widely concerned. Sensors such as camera, lidar and millimeter wave radar equipped on the automobiles can sense surrounding road environments and quickly and accurately acquire information such as their own position as well as position, size and moving direction of surrounding targets, which can ensure the safe and stable driving of the unmanned vehicles on the road.

An automatic driving system needs to accurately locate a position of the vehicle in operation for planning a driving route. A method for positioning the vehicle by adopting a traditional civil GPS can only determine the road where the vehicle is located but cannot accurately acquire the lane where the vehicle is located. This will affect misjudgment of the autonomous vehicles for driving routes and lane change requirements. However, using RTK (Real Time Kinematic) and other high-precision positioning devices to acquire accurate position depends on the accuracy of high-precision maps, which has high cost and limited application scope. In addition, the traditional lane positioning method is difficult to cope with complex environment, such as blurred road edges, target occlusion, illumination changes and other road conditions, and has poor stability and interference prevention capability.

SUMMARY

In order to solve at least one problem of the prior art, at least one embodiment of the present disclosure provides a vehicle positioning method and device, an electronic device and a storage medium.

In a first aspect, the embodiments of the present disclosure provide a vehicle positioning method, comprising:
 determining a current positioning-established lane on the basis of current position information of a vehicle, road information sensed by the vehicle and map information;
 comparing the road information sensed by the vehicle acquired in real time with the current positioning-established lane to determine a mismatch integral value;
 after determining that the mismatch integral value is greater than or equal to a preset integral value, returning to execute the operation of determining the current positioning-established lane on the basis of the current position information of the vehicle, the road information sensed by the vehicle and map information.

In a second aspect, the embodiments of the present disclosure also provide a vehicle positioning apparatus, comprising: an initialization module used for determining a current positioning-established lane on the basis of current position information of a vehicle, road information sensed by the vehicle and map information;
 a positioning monitoring module used for comparing the road information sensed by the vehicle acquired in real time with the current positioning-established lane to determine a mismatch integral value;
 a determination module used for determining whether the mismatch integral value is greater than or equal to a preset integral value, and when the mismatch integral value is greater than or equal to the preset integral value, instructing the initialization module to execute the operation of determining the current positioning-established lane on the basis of the current position information of the vehicle, the road information sensed by the vehicle and the map information again.

In a third aspect, the embodiments of the present disclosure also provide an electronic device, comprising: a memory and a processor;
 the processor being configured for executing the steps of the method according to the first aspect by calling a program or instruction stored in the memory.

In a fourth aspect, the embodiments of the present disclosure also provide a computer readable storage medium for storing a program or instruction, and the program or instruction enables a computer to execute the steps of the method according to the first aspect.

It can be seen that in at least one embodiment of the embodiment of the present disclosure, firstly, the current positioning-established lane is determined based on the current position information of the vehicle, the road information sensed by the vehicle and the map information, that is, the initial vehicle lane positioning is performed first. Then, the road information sensed by the vehicle acquired in real time is compared with the current positioning-established lane to determine the mismatch integral value. In fact, this step is to monitor the lane positioning, analyze the unconformity with the current positioning-established lane on the basis of the road information sensed by the vehicle acquired in real time, and determine the mismatch integral value. When the mismatch integral value is greater than or equal to the preset integral value, it is instructed that the positioning of the positioning-established lane in this case is failed, and it is necessary to re-determine the positioning-established lane. Then, it is necessary to return to execute the operation of determining the positioning-established lane on the basis of the current position information of the vehicle, the road information sensed by the vehicle and the map information again. Compared with the prior art, the embodiments of the present disclosure do not need to rely on RTK for high-precision positioning, and the implementation cost is low. In addition, after determining the current positioning-established lane according to the current position information of the vehicle, the road information sensed by the vehicle and the map information, it is continuously monitored whether the positioning-established lane is correct by the way of comparing the road information sensed by the vehicle acquired in real time with the current positioning-established lane and determining the mismatch integral value, thus improving the lane positioning stability and the interference prevention capability.

BRIEF DESCRIPTION OF THE DRAWINGS

In order to more clearly illustrate the technical solutions of the embodiments of the present disclosure, the drawings that are required to describe the embodiments or the prior art will be briefly introduced below. Apparently, the drawings that are described below are embodiments of the present disclosure, and a person skilled in the art can obtain other drawings according to these drawings without paying creative work.

DETAILED DESCRIPTION OF THE EMBODIMENTS

In order to make the above objects, features and advantages of the present disclosure be more clearly understood, the present disclosure will be described in further detail below with reference to the drawings and embodiments. It can be understood that the embodiments described are merely a part of, rather than all of, the embodiments of the present disclosure. The specific embodiments described herein are merely illustrative of the present disclosure and are not intended to limit the present disclosure. Based on the embodiments of the present disclosure described, all the other embodiments obtained by a person of ordinary skills in the art shall fall within the scope of protection of the present disclosure.

It should be noted that relational terms herein such as "first", "second", and the like, are used merely to distinguish one entity or operation from another entity or operation, and do not necessarily require or imply there is any such relationship or order between these entities or operations.

Figure 1:
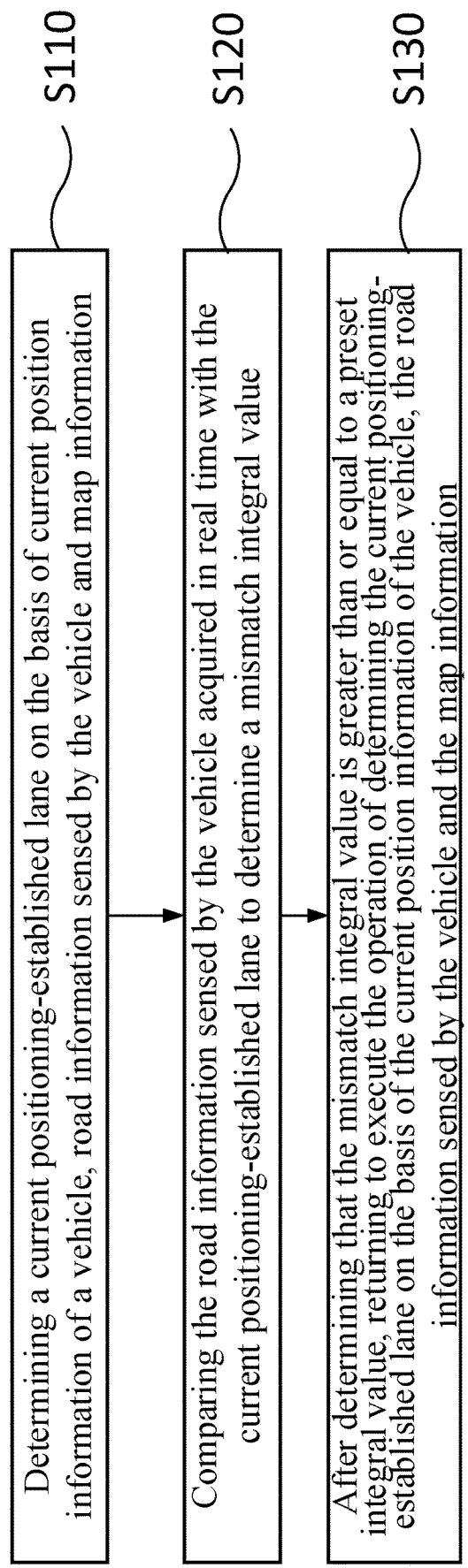
FIG. 1 is a schematic flowchart of a vehicle positioning method provided by the embodiments of the present disclosure.

FIG. 1 is a schematic flowchart of a vehicle positioning method provided by the embodiments of the present disclosure. As shown in FIG. 1, the vehicle positioning method provided by the embodiments of the present disclosure comprises S110 to S130.

S110: determining a current positioning-established lane on the basis of current position information of a vehicle, road information sensed by the vehicle and map information.

The vehicle may be equipped with a positioning device, such as a Global Positioning System (GPS) positioning device and an Inertial Measurement Unit (IMU). The GPS positioning system device can obtain satellite signals, calculate latitude and longitude information in real time, and determine current position information of the vehicle according to the latitude and longitude information. The current position information of the vehicle may comprise, for example, a road where the vehicle is located and a driving direction. After determining the road where the vehicle is located and the driving direction, a total number of lanes corresponding to the current road and information about whether there are emergency lanes according to the map information (hereinafter referred to as a lane model for convenience of description) may be read.

The vehicle may also be provided with an acquisition apparatus, comprising but not limited to a camera, a laser radar and the like. The acquisition apparatus in this embodiment may acquire the road information sensed by the vehicle. The road information sensed by the vehicle comprises, but is not limited to, sensed lane line information, sensed guardrail information and surrounding vehicle information. The sensed guardrail information may comprise, for example, lateral position, slope, curvature, confidence and the like of the guardrail. The sensed lane line information may comprise, for example, lateral distance, slope, curvature, line type (full line, dotted line), confidence and the like of the lane line. The surrounding vehicle information may comprise, for example, longitudinal position, lateral position, longitudinal vehicle speed and the like of a moving vehicle. The road information sensed by the vehicle refers to real road information near the location of the vehicle acquired by the acquisition apparatus in real time The embodiments of the present disclosure first acquire the current position information of the vehicle, look up a lane model corresponding to the map information according to the current position information of the vehicle, and then preliminarily determine which lane of the lane model the vehicle is currently located in according to the road information sensed by the vehicle. For example, according to the current position information of the vehicle and the map information, it is determined that the lane model corresponding to the road where the vehicle is currently located is lane 3. The sensed lane line information in the road information sensed by the vehicle is that the left lane line 2 is a full line, the left lane line 1 is a dotted line, the right lane line 1 is a dashed line, and a right lane line 2 is a full line in turn. According to the sensed lane line information and the lane model, it is preliminarily determined that the vehicle is currently in a middle lane of the lane model, that is, the current positioning-established lane is the middle lane.

In some embodiments, the determining the current positioning-established lane on the basis of current position information of the vehicle, the road information sensed by the vehicle and the map information in S110 comprises:

S111: generating a lane integral table on the basis of the current position information of the vehicle and the map information;

S112: determining an integral value of each lane in the lane integral table on the basis of the road information sensed by the vehicle; and S113: determining a lane with an integral value greater than a first preset value in the lane integral table as the positioning-established lane.

For example, when it is determined that a total number of current lanes is 3 based on the current position information of the vehicle and the map information, the generated lane integral table is a 3×1 array for storing integral values of each lane. On the basis of the road information sensed by the vehicle, qualified lanes are integrated according to the integration rules, and integration results are saved in the lane integral table. If an integral value of a certain lane in the lane integral table exceeds the first preset value, it is determined that the current vehicle is in this lane, and the vehicle positioning is completed. If the integral value of each lane does not exceed the first preset value, the integration is continued.

In some embodiments, after the determining the current positioning-established lane on the basis of the current position information of the vehicle, the road information sensed by the vehicle and the map information, the method further comprises the step of, after determining that the current number of lanes changes, clearing the lane integral table.

If the number of the current number of lanes changes during the process of determining the current positioning-established lane on the basis of the current position information of the vehicle, the road information sensed by the vehicle and the map information, then a misjudge may occur when determining the current positioning-established lane according to the integral values in the original lane integral table, so the lane integral table is cleared after determining that the current number of lanes changes in this embodiment.

In some embodiments, the road information sensed by the vehicle comprises sensed lane line information and sensed guardrail information. The determining the integral value of each lane in the lane integral table on the basis of the road information sensed by the vehicle in S112 comprises:

determining a number of lanes in the map information corresponding to the current position information of the vehicle, and determining the integral value of each lane in the lane integral table on the basis of first integration rules corresponding to the number of lanes, the sensed lane line information and the sensed guardrail information.

For example, according to the current position information of the vehicle positioned by GPS, the lane information corresponding to this position, such as the number of lanes, lane line information, guardrail information, etc., is determined from the map information, and the lane integral table is established. Integral calculation is carried out according to the preset first integration rule, the sensed lane line information and the sensed guardrail information to determine the integral value of each lane in the lane integral table.

The first integration rules may be set respectively according to the number of lanes, for example, on the basis of the situations that the total number of lanes comprises a single lane, two lanes, three lanes, four lanes and above.

Because the reliability of guardrail detection is not as good as the reliability of lane line, sometimes the guardrail cannot be detected. Therefore, the embodiments of the present disclosure integrate the sensed lane line information and the sensed guardrail information for integration.

The first integration rule corresponding to the number of lanes being one is: when the road information sensed by the vehicle is that a lane line on one side is a full line, and a guardrail is provided on a left side, adding point to the single lane located. For the case that the number of lanes is one, that is, single lane, the sensed lane line information and the sensed guardrail information are integrated for integration. In the road information sensed by the vehicle, when a right side lane is a full line and a guardrail is provided on the left side, point is added to the single lane located.

The first integration rule corresponding to the number of lanes being two is: when the sensed lane line information and the sensed guardrail information are that a left nearest lane line is a full line, while a right nearest lane line is a dotted line, adding point to the left side lane; when the sensed lane line information and the sensed guardrail information are that a guardrail is provided on the left side, while the right nearest lane line is a dotted line, adding point to the left side lane; and when the sensed lane line information and the sensed guardrail information are that the right nearest lane line is a full line and the left nearest lane line is a dotted line, adding point to the right side lane; and when the sensed lane line information and the sensed guardrail information are that a guardrail is provided on the right side and the left nearest lane line is a dotted line, adding point to the right side lane.

Figure 2:
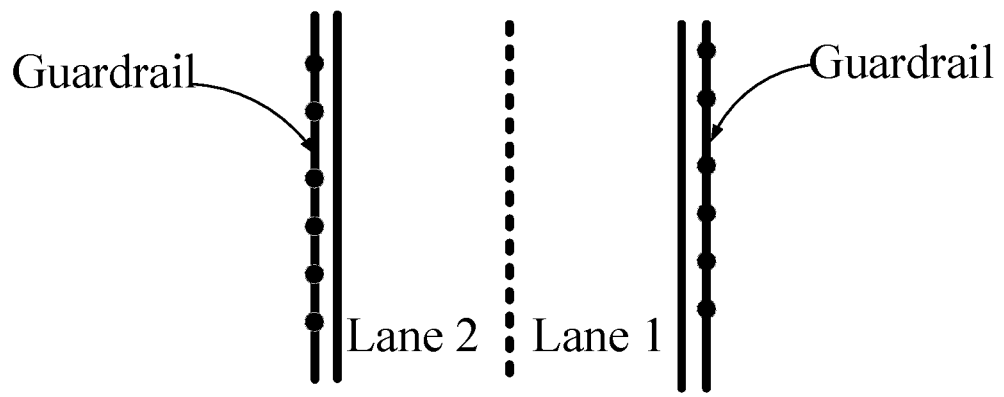
FIG. 2 is a schematic diagram of two lanes.

FIG. 2 is a schematic diagram of two lanes, in which a left side lane is lane 2 and a right side lane is lane 1.

When the sensed lane line information and the sensed guardrail information are that the left nearest lane line is a full line and the right nearest lane line is a dotted line, it means that the real lane where the current vehicle is located is more in line with the left side lane, that is, lane 2, and then point is added to the left side lane.

When the sensed lane line information and the sensed guardrail information are that a guardrail is provided on the left side left and the right nearest lane line is a dotted line, it means that the real lane where the current vehicle is located is more in line with the left side lane, that is, lane 2, and then point is added to the left side lane.

When the sensed lane line information and the sensed guardrail information are that the right nearest lane line is a full line and the left nearest lane line is a dotted line, it means that the real lane where the current vehicle is located is more in line with the right side lane, that is, lane 1, and then point is added to the right side lane.

When the sensed lane line information and the sensed guardrail information are that a guardrail is provided on the right side and the left nearest lane line is a dotted line, it means that the real lane where the current vehicle is located is more in line with the right side lane, that is, lane 1, and then point is added to the right side lane.

In the above description, the left nearest lane line of the vehicle refers to the left lane line 1, and the right nearest lane line of the vehicle refers to the right lane line 1.

The first integration rule corresponding to the number of lanes being three is: when the sensed lane line information and the sensed guardrail information are that a left nearest lane line and a right nearest lane line are both a dotted line without a guardrail, adding point to a middle lane; when the sensed lane line information and the sensed guardrail information are that the left nearest lane line is a full line, while the right nearest lane line is a dotted line and no guardrail is provided on the right side, adding point to the left side lane; when the sensed lane line information and the sensed guardrail information are that a guardrail is provided on the left side, while the right nearest lane line is a dotted line and no guardrail is provided on the right side, adding point to the left side lane; and when the sensed lane line information and the sensed guardrail information are that the right nearest lane line is a full line, while the left nearest lane line is a dotted line and no guardrail is provided on the left side, adding point to the right side lane.

Figure 3:
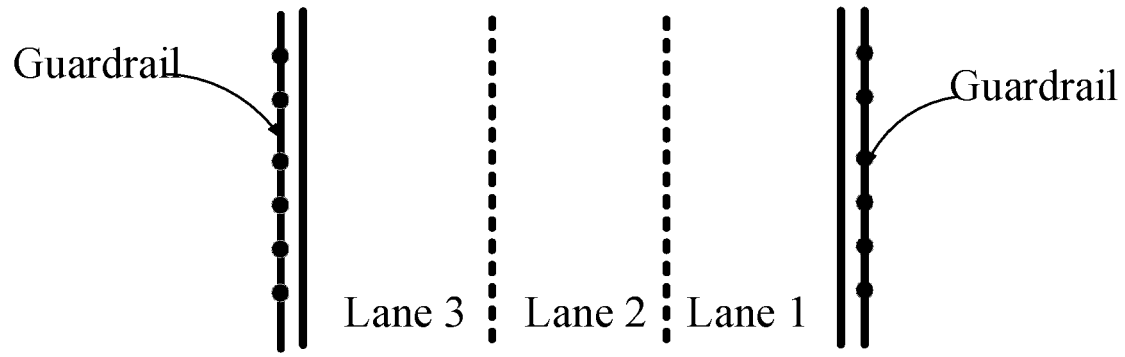
FIG. 3 is a schematic diagram of three lanes.

FIG. 3 is a schematic diagram of three lanes, in which a left side lane is lane 3, a right side lane is lane 1 and a middle lane is lane 2.

When the sensed lane line information and the sensed guardrail information are that the left nearest lane line and the right nearest lane line are both a dotted line without a guardrail, it means that the real lane where the current vehicle is located is more in line with the middle lane, that is, lane 2, and then point is added to the middle lane.

When the sensed lane line information and the sensed guardrail information are that the left nearest lane line is a full line, while the right nearest lane line is a dotted line and no guardrail is provided on the right side, it means that the real lane where the current vehicle is located is more in line with the left side lane, that is, lane 3, and then point is added to the left side lane.

When the sensed lane line information and the sensed guardrail information are that a guardrail is provided on the left side, while the right nearest lane line is a dotted line and no guardrail is provided on the right side, it means that the real lane where the current vehicle is located is more in line with the left side lane, that is, lane 3, and then point is added to the left side lane.

When the sensed lane line information and the sensed guardrail information are that the right nearest lane line is a full line, while the left nearest lane line is a dotted line and no guardrail is provided on the left side, it means that the real lane where the current vehicle is located is more in line with the right side lane, that is, lane 1, and then point is added to the right side lane.

The first integration rule corresponding to the number of lanes being greater than or equal to four: when the sensed lane line information and the sensed guardrail information are that a left nearest lane line is a full line, while a right nearest lane line is a dotted line and no guardrail is provided on the right side, adding point to the leftmost side lane; when the sensed lane line information and the sensed guardrail information are that a guardrail is provided on the left side, while the right nearest lane line is a dotted line and no guardrail is provided on the right side, adding point to the leftmost side lane; when the sensed lane line information and the sensed guardrail information are that the right nearest lane line is a full line, while the left nearest lane line is a dotted line and no guardrail is provided on the left side, adding point to the rightmost side lane; and when the sensed lane line information and the sensed guardrail information are that the left nearest lane line and the right nearest lane line are both a dotted line without a guardrail, comparing the sensed lane line information and the sensed guardrail information with a lane line of each lane in the middle, and adding point to the middle lane in accordance with the comparison.

Figure 4:
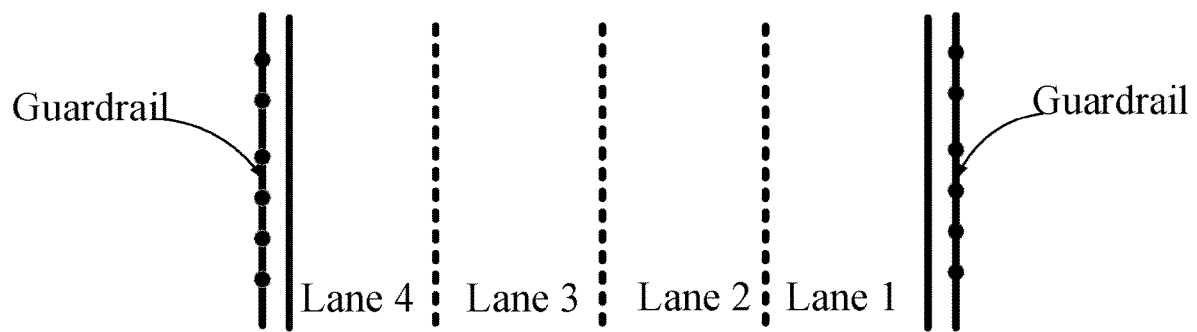
FIG. 4 is a schematic diagram of four lanes.

FIG. 4 is a schematic diagram of four lanes, which are exemplarily set to be lane 1, lane 2, lane 3, and lane 4 from right to left in turn.

When the sensed lane line information and the sensed guardrail information are that the left nearest lane line is a full line, while the right nearest lane line is a dotted line and no guardrail is provided on the right side, it means that the real lane where the current vehicle is located is more in line with the leftmost side lane, that is, lane 4, and then point is added to the left side lane.

When the sensed lane line information and the sensed guardrail information are that a guardrail is provided on the left side, while the right nearest lane line is a dotted line and no guardrail is provided on the right side, it means that the real lane where the current vehicle is located is more in line with the leftmost side lane, that is, lane 4, and then point is added to the left side lane.

When the sensed lane line information and the sensed guardrail information are that the right nearest lane line is a full line, while the left nearest lane line is a dotted line and no guardrail is provided on the left side, it means that the real lane where the current vehicle is located is more in line with the right side lane, that is, lane 1, and then point is added to the right side lane.

When the sensed lane line information and the sensed guardrail information are that the left nearest lane line and the right nearest lane line are both a dotted line without a guardrail, it means that the real lane where the current vehicle is located is more in line with the middle lane, such as lane 2 or lane 3. Then the sensed lane line information and the sensed guardrail information are compared with the lane line of each lane in the middle, and point is added to the middle lane in accordance with the comparison.

The sensed lane line information and the sensed guardrail information may be compared with the lane line of each lane in the middle in the way of traversing each middle lane. For example, taking FIG. 4 as an example, the sensed lane line information and the sensed guardrail information may be compared with the lane lines on both sides of lane 2. WHEN the comparison is consistent, then point is added to lane 2. When the comparison is inconsistent, the sensed lane line information and the sensed guardrail information are compared with lane lines on both sides of lane 3, and when the comparison is consistent, point is added to lane 3. When the comparison is inconsistent, no point is added temporarily.

It should be noted that the greater the conditions met in the above integration process, the more integrals.

In some embodiments, the road information sensed by the vehicle may further comprise surrounding vehicle information, and after the determining the number of lanes in the map information corresponding to the current position information of the vehicle, and determining the integral value of each lane in the lane integral table on the basis of the first integration rules corresponding to the number of lanes, the sensed lane line information and the sensed guardrail information, the method further comprises:
  updating the integral value of each lane in the lane integral table on the basis of second integration rules corresponding to the number of lanes and the surrounding vehicle information.

The embodiments of the present disclosure may also correct the integral value of each lane in the lane integral table according to the sensed surrounding vehicle information. The surrounding vehicle information can be acquired by cameras, lidar and other apparatuses, qualified lanes can be integrated according to the second integration rules corresponding to the number of lanes, and the integral value of each lane in the lane integral table can be updated.

For example, the second integration rule corresponding to the number of lanes being two is: when the surrounding vehicle information is that a moving vehicle is identified on a left side and a lateral distance between the moving vehicle and the current vehicle is greater than a second preset value, adding point to the right side lane; and when the surrounding vehicle information is that a moving vehicle is identified on a right side and a lateral distance between the moving vehicle and the current vehicle is greater than the second preset value, adding point to the left side lane.

Figure 5:
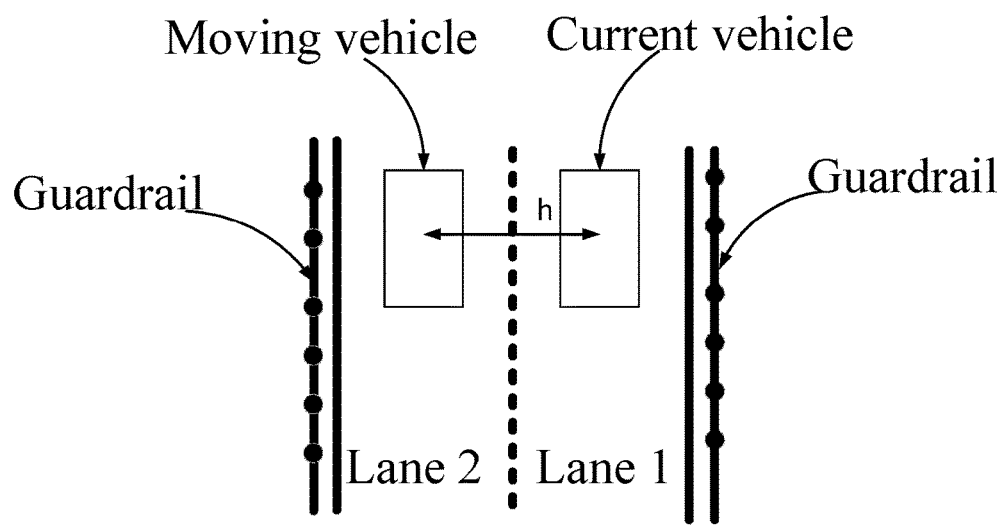
FIG. 5 is a schematic diagram of two lanes with a moving vehicle on a left side.

As shown in FIG. 5, when the surrounding vehicle information is that moving vehicle is identified on the left side, it means that the moving vehicle is on the left side of the vehicle. When the identified lateral distance h between the moving vehicle in the left side and the current vehicle is greater than the second preset value, it means that the moving vehicle in the left side and the current vehicle are not in the same lane. The second preset value may be set according to actual road scenarios. In this case, it shows that the real lane where the current vehicle is located is more in line with the right side lane, that is, lane 1, so point is added to the right side lane.

Figure 6:
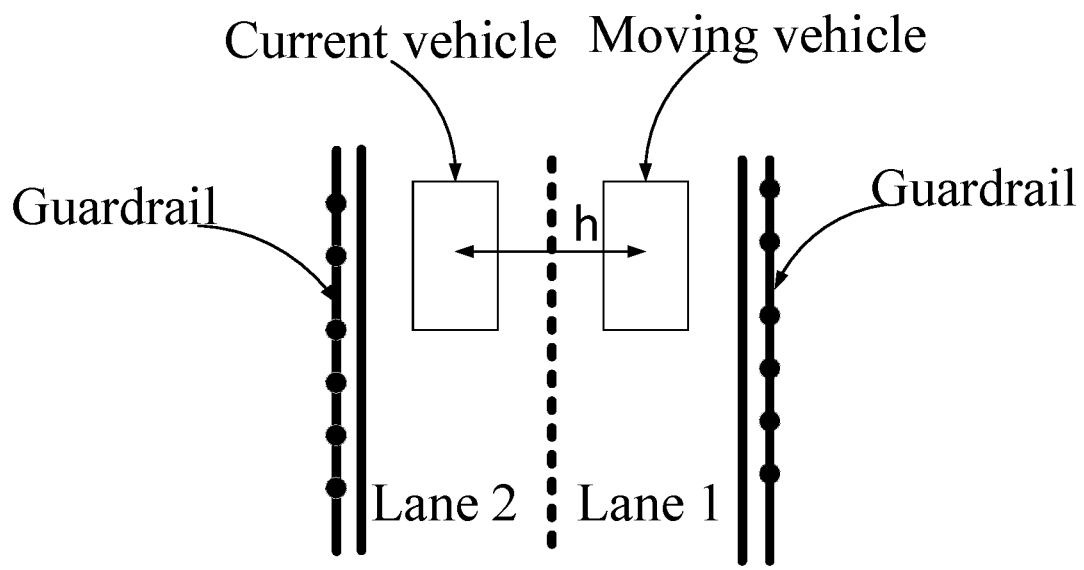
FIG. 6 is a schematic diagram of two lanes with a moving vehicle on a right side.

As shown in FIG. 6, when the surrounding vehicle information is that a moving vehicle is identified on the right side, it means that the moving vehicle is on the right side of the vehicle. When the identified lateral distance h between the moving vehicle in the right side and the current vehicle is greater than the second preset value, it means that the moving vehicle in the right side and the current vehicle are not in the same lane. In this case, it shows that the real lane where the current vehicle is located is more in line with the left side lane, that is, lane 1, so point is added to the left side lane.

The second integration rule corresponding to the number of lanes being greater than or equal to three is: when the surrounding vehicle information is that a moving vehicle is identified on a left side and a lateral distance between the moving vehicle and the current vehicle is greater than the second preset value, deducting point from the leftmost side lane; when the surrounding vehicle information is that a moving vehicle is identified on a right side and a lateral distance between the moving vehicle and the current vehicle is greater than the second preset value, deducting point from the rightmost side lane; and when the number of lanes is equal to three, the surrounding vehicle information is that moving vehicles are identified on both left and right sides and the lateral distance between the moving vehicles and the current vehicle is greater than the second preset value, adding point to the middle lane.

Figure 7:
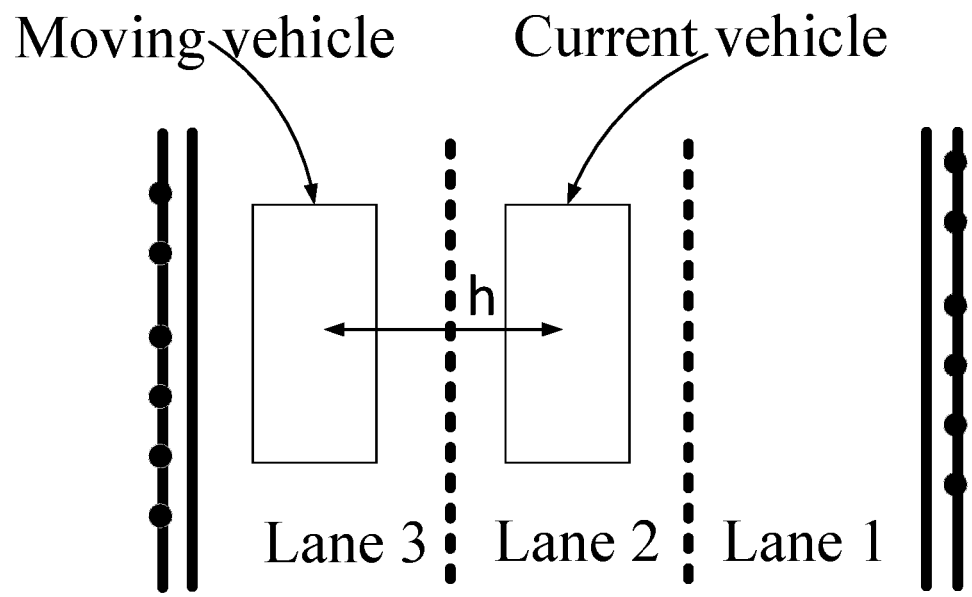
FIG. 7 is a schematic diagram of three lanes with a moving vehicle on the left side.

As shown in FIG. 7, taking three lanes as an example, when the surrounding vehicle information is that a moving vehicle is identified on the left side, it means that the moving vehicle is on the left side of the vehicle. When the identified lateral distance h between the moving vehicle in the left side and the current vehicle is greater than the second preset value, it means that the moving vehicle in the left side and the current vehicle are not in the same lane. Then it means that the current vehicle cannot be located in the leftmost side lane, so point is deducted from the leftmost side lane (lane 3 in FIG. 7).

Figure 8:
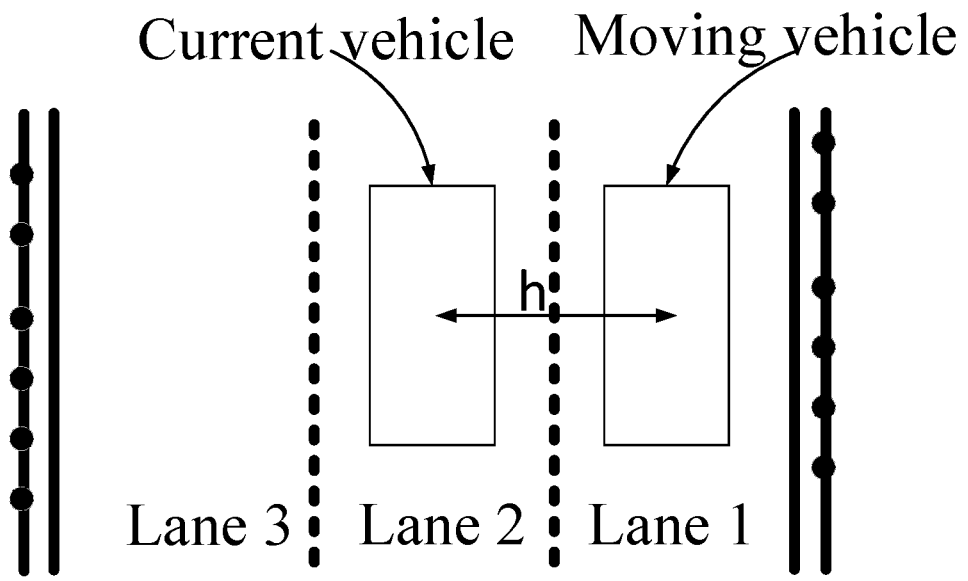
FIG. 8 is a schematic diagram of three lanes with a moving vehicle on the right side.

As shown in FIG. 8, when the surrounding vehicle information is that a moving vehicle is identified on the right side, it means that the moving vehicle is on the right side of the vehicle. When the identified lateral distance h between the moving vehicle in the right side and the current vehicle is greater than the second preset value, it means that the moving vehicle in the right side and the current vehicle are not in the same lane. Then it means that the current vehicle cannot be located in the rightmost side lane, so point is deducted from the rightmost side lane (lane 1 in FIG. 8).

Figure 9:
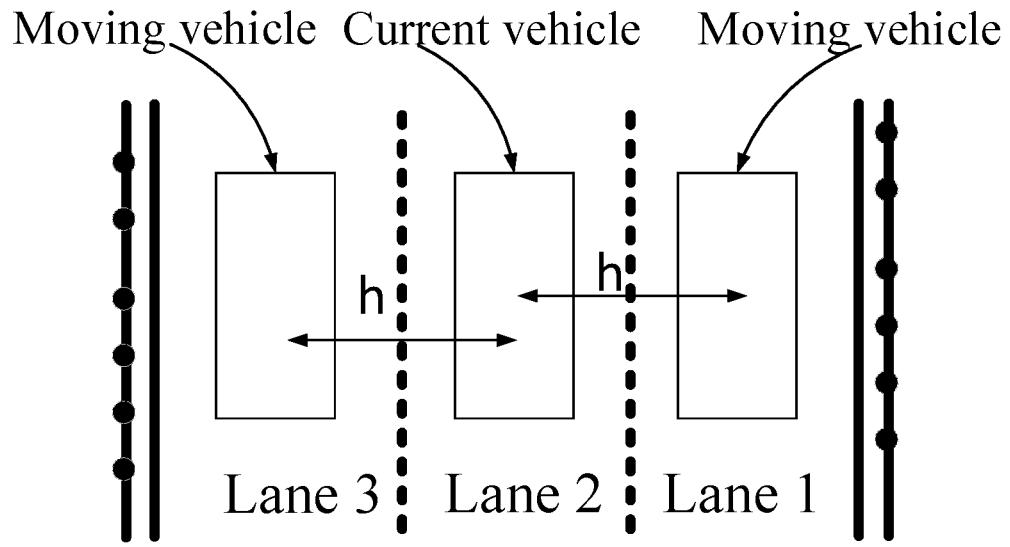
FIG. 9 is a schematic diagram of three lanes with a moving vehicle both on the left and right sides.

When the number of lanes is greater than three, and the surrounding vehicle information is that the moving vehicle is recognized on both the left and right sides and the lateral distance from the current vehicle is greater than the second preset value, then it means that the current vehicle is located in a certain middle lane, but it is not sure which middle lane the current vehicle is. As shown in FIG. 9, when the number of lanes is equal to three, there is only middle lane. When the surrounding vehicle information is that the moving vehicle is recognized on both the left and right sides and the lateral distance from the current vehicle is greater than the second preset value, and then it means that the current vehicle is in the middle lane, then point is added to the middle lane.

It should be noted that in the process of deducting, a lower limit of the integral value of each lane in the lane integral table is controlled to zero, that is, after the integral value is zero, the deducting operation is no longer carried out.

In some embodiments, for example, to prevent misjudgment of sensors (such as cameras, laser radars, etc.) when determining the surrounding vehicle information, the operation of updating the integral value of each lane in the lane integral table on the basis of the second integral rules corresponding to the number of lanes and the surrounding vehicle information is performed after determining that the duration of the lateral distance between the moving vehicle and the current vehicle greater than the second preset value through the surrounding vehicle information is greater than the first preset time. This setting can avoid misjudgment caused by short-term fluctuation of data detected by the sensors.

S120: comparing the road information sensed by the vehicle acquired in real time with the current positioning-established lane to determine a mismatch integral value.

After the preliminary lane positioning of the vehicle is completed, the current positioning-established lane may be continuously monitored. In this step, the road information sensed by the vehicle is acquired in real time, and the road information sensed by the vehicle acquired in real time is compared with the current positioning-established lane determined at the previous moment, and the mismatch integral value is determined according to the comparison result. In this step, the comparison integration rules can be set according to the actual needs. For example, different contrast integration rules can be specified for different currently located lanes, which conforms to the contrast integration rules, and the mismatch integration value is increased by 1.

In some embodiments, the comparing the road information sensed by the vehicle acquired in real time with the current positioning-established lane to determine the mismatch integral value comprises: determining the mismatch integral value on the basis of third integration rules corresponding to the current positioning-established lane and the road information sensed by the vehicle acquired in real time.

Different third integration rules correspond to the types of current positioning-established lanes, for example, the left lane, the right lane and the middle lane correspond to different third integration rules.

The third integration rule corresponding to the current positioning-established lane which is a leftmost side lane is: when the road information sensed by the vehicle acquired in real time is that a left nearest lane line is a dotted line and no guardrail is provided on a left side, increasing the mismatch integral value; and when the road information sensed by the vehicle acquired in real time is that a guardrail is provided on a right side, and a total number of lanes is greater than one, increasing the mismatch integral value.

The third integration rule corresponding to the current positioning-established lane which is a rightmost side lane is: when the road information sensed by the vehicle acquired in real time is that a right nearest lane line is a dotted line and no guardrail is provided on a right side, increasing the mismatch integral value; and when the road information sensed by the vehicle acquired in real time is that a guardrail is provided on a left side, and a total number of lanes is greater than one, increasing the mismatch integral value.

The third integration rule corresponding to the current positioning-established lane which is a middle lane is: when the road information sensed by the vehicle acquired in real time is that a distance between a second lane line in the left side and the current vehicle is less than a first threshold, and the second lane line is a full line, increasing the mismatch integral value; when the road information sensed by the vehicle acquired in real time is that a distance between a second lane line in the right side and the current vehicle is less than the first threshold, and the second lane line in the right side is a full line, increasing the mismatch integral value; when the road information sensed by the vehicle acquired in real time is that a guardrail is provided on the left side and a distance between the guardrail and the current vehicle is less than a second threshold, increasing the mismatch integral value; and when the road information sensed by the vehicle acquired in real time is that a guardrail is provided on the right side and a distance between the guardrail and the current vehicle is less than the second threshold, increasing the mismatch integral value.

When the current positioning-established lane is the leftmost side lane, while the road information sensed by the vehicle acquired in real time is that the left nearest lane line is a dotted line and no guardrail is provided on the left side, it is predicted that the actual lane of the current vehicle is not in the leftmost side lane according to the road information sensed by the vehicle acquired in real time, which indicates that the actual lane of the current vehicle is inconsistent with the current positioning-established lane, so the mismatch integral value of the current positioning-established lane is increased. When the current positioning-established lane is the leftmost side lane, while the road information sensed by the vehicle acquired in real time is that a guardrail is provided on the right side and the total number of lanes is greater than one, it is predicted that the actual lane of the current vehicle is not in the leftmost side lane according to the road information sensed by the vehicle acquired in real time, which indicates that the actual lane of the current vehicle is inconsistent with the current positioning-established lane, so the mismatch integral value of the current positioning-established lane is increased.

When the current positioning-established lane is the rightmost side lane, while the road information sensed by the vehicle acquired in real time is that the right nearest lane line is a dotted line and no guardrail is provided on the right side, it is predicted that the actual lane of the current vehicle is not in the rightmost side lane according to the road information sensed by the vehicle acquired in real time, which indicates that the actual lane of the current vehicle is inconsistent with the current positioning-established lane, so the mismatch integral value of the current positioning-established lane is increased. When the current positioning-established lane is the rightmost side lane, while the road information sensed by the vehicle acquired in real time is that a guardrail is provided on the left side and the total number of lanes is greater than one, it is predicted that the actual lane of the current vehicle is not in the rightmost side lane according to the road information sensed by the vehicle acquired in real time, which indicates that the actual lane of the current vehicle is inconsistent with the current positioning-established lane, so the mismatch integral value of the current positioning-established lane is increased.

When the current positioning-established lane is the middle lane, while the road information sensed by the vehicle acquired in real time is that the distance between the second lane line in the left side and the current vehicle is less than the first threshold, and the second lane line in the left side is a full line, it is predicted that the actual lane of the current vehicle is not in the middle lane according to the road information sensed by the vehicle acquired in real time, which indicates that the actual lane of the current vehicle is inconsistent with the current positioning-established lane, so the mismatch integral value of the current positioning-established lane is increased. When the current positioning-established lane is the middle lane, while the road information sensed by the vehicle acquired in real time is that the distance between the second lane line in the right side and the current vehicle is less than the first threshold, and the second lane line in the right side is a full line, it is predicted that the actual lane of the current vehicle is not in the middle lane according to the road information sensed by the vehicle acquired in real time, which indicates that the actual lane of the current vehicle is inconsistent with the current positioning-established lane, so the mismatch integral value of the current positioning-established lane is increased. When the current positioning-established lane is the middle lane, while the road information sensed by the vehicle acquired in real time is that a guardrail is provided on the left side and the distance between the guardrail and the current vehicle is less than the second threshold, it is predicted that the actual lane of the current vehicle is not in the middle lane according to the road information sensed by the vehicle acquired in real time, which indicates that the actual lane of the current vehicle is inconsistent with the current positioning-established lane, so the mismatch integral value of the current positioning-established lane is increased. When the current positioning-established lane is the middle lane, while the road information sensed by the vehicle acquired in real time is that a guardrail is provided on the right side and the distance between the guardrail and the current vehicle is less than the second threshold, it is predicted that the actual lane of the current vehicle is not in the middle lane according to the road information sensed by the vehicle acquired in real time, which indicates that the actual lane of the current vehicle is inconsistent with the current positioning-established lane, so the mismatch integral value of the current positioning-established lane is increased.

The greater the conditions met in the above point increasing process, the more integrals.

In some embodiments, after determining that the road information sensed by the vehicle acquired in real time is not in conformity with any of the third integration rules, the mismatch integral value may be cleared. Before comparing the road information sensed by the vehicle acquired in real time with the current positioning-established lane, the mismatch integral value is zero. However, it is possible that the short-term fluctuation of the data detected by the sensors may lead to misjudgment. To prevent this situation, after it is determined that the r road information sensed by the vehicle acquired in real time is not in conformity with any of the third integration rules, the mismatch integral value is cleared to zero.

S130: after determining that the mismatch integral value is greater than or equal to a preset integral value, returning to execute the operation of determining the current positioning-established lane on the basis of the current position information of the vehicle, the road information sensed by the vehicle and the map information.

In the process of determining the mismatch integral value, the greater the conditions that conform to the comparison integration rules, the more points will be added to the mismatch integral value. Therefore, after determining that the mismatch integral value is greater than or equal to the preset integral value, the embodiments of the present disclosure returns to execute the operation of determining the current positioning-established lane on the basis of the current position information of the vehicle, the road information sensed by the vehicle and the map information.

According to the embodiments of the present disclosure, firstly, the current positioning-established lane is determined based on the current position information of the vehicle, the road information sensed by the vehicle and the map information, the current positioning-established lane is determined first, then the lane positioning is monitored, and the road information sensed by the vehicle acquired in real time is compared with the current positioning-established lane to determine the mismatch integral value. When the mismatch integral value is greater than or equal to the preset integral value, it is instructed that the positioning of the positioning-established lane in this case is failed, and it is necessary to re-determine the positioning-established lane. Then, it is necessary to return to execute the operation of determining the positioning-established lane on the basis of the current position information of the vehicle, the road information sensed by the vehicle and the map information again. Compared with the prior art, the embodiments of the present disclosure do not need to rely on RTK for high-precision positioning, so the implementation cost is low. In addition, after determining the current positioning-established lane according to the current position information of the vehicle, the road information sensed by the vehicle and the map information, it is continuously monitored whether the positioning-established lane is correct in the embodiments of the present disclosure by the way of comparing the road information sensed by the vehicle acquired in real time with the current positioning-established lane and determining the mismatch integral value, and after the mismatch integral value is greater than the preset integral value, the current positioning-established lane is determined on the basis of the current position information of the vehicle, the road information sensed by the vehicle and the map information again. Therefore, compared with the way of matching the map information with the lane line type only sensed by the camera in the prior art, the lane positioning stability and interference prevention capability can be improved.

Figure 10:
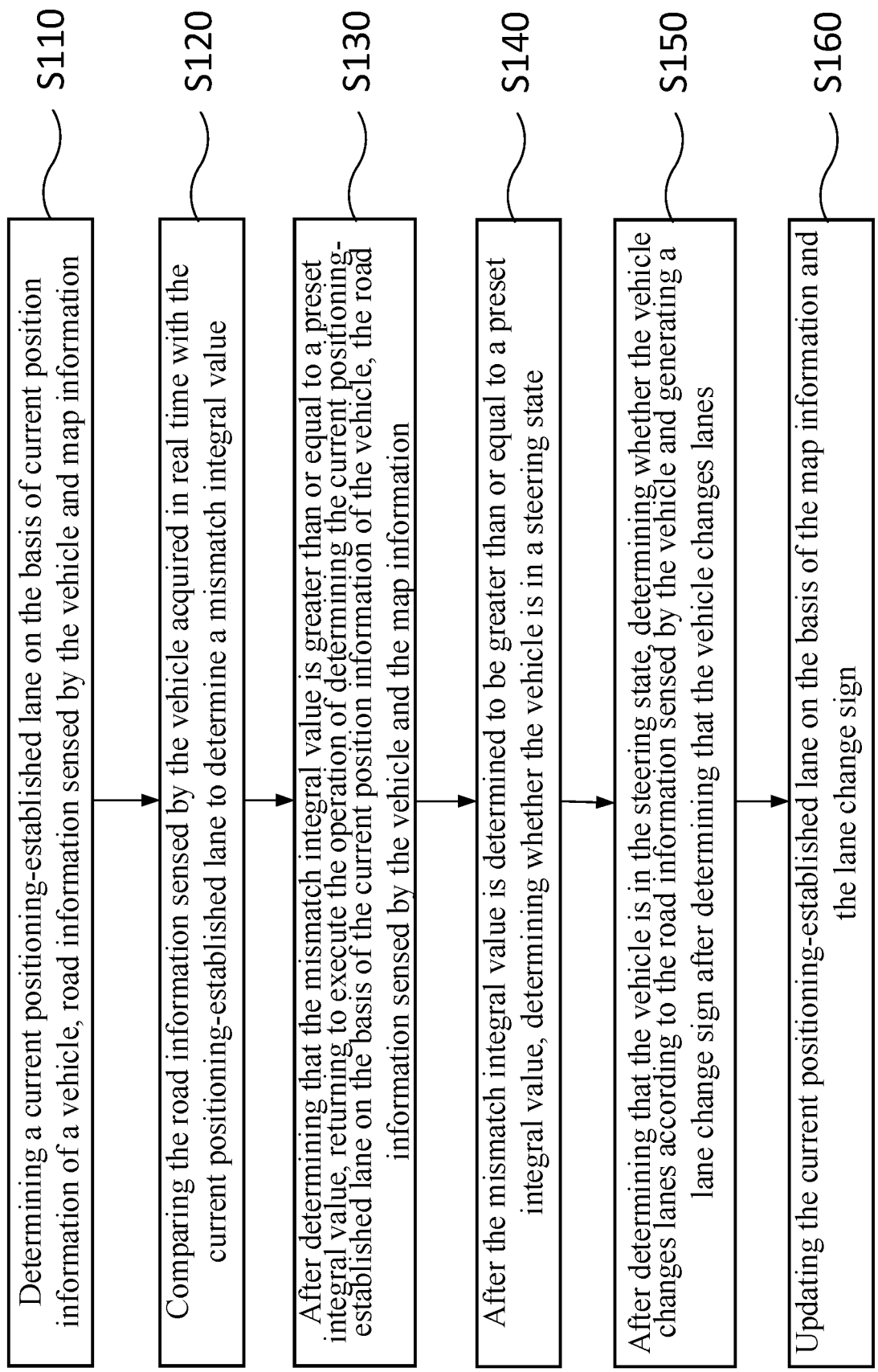
FIG. 10 is a schematic flowchart of another vehicle positioning method provided by the embodiments of the present disclosure.

In some embodiments, referring to FIG. 10, the vehicle positioning method may also comprise: S140 to S160.

S140: after the mismatch integral value is determined to be greater than or equal to a preset integral value, determining whether the vehicle is in a steering state.

When the mismatch integral value is less than the preset integral value, it means that the current positioning-established lane is more in line with the road information sensed by the vehicle, so the embodiments of the present disclosure continue to monitor the steering of the vehicle to determine whether the vehicle is in the steering state.

In some embodiments, the determining whether the vehicle is in the steering state may comprise: determining whether the vehicle is in the steering state on the basis of a steering wheel angle and/or yaw velocity signal. For example, the steering wheel angle and/or yaw velocity signal of the vehicle may be read from a chassis system, and when one of the steering wheel angle and the yaw velocity signal exceeds the threshold value, the vehicle is determined to be in the steering state.

S150: after determining that the vehicle is in the steering state, determining whether the vehicle changes lanes according to the road information sensed by the vehicle and generating a lane change sign after determining that the vehicle changes lanes.

When the vehicle is in the steering state, whether the vehicle change lanes is determined according to the road information sensed by the vehicle, lane change monitoring is carried out, and the lane change sign is generated after it is determined that the vehicle changes lanes. When the vehicle is in the steering state, and it is found that the vehicle changes lanes according to the road information sensed by the vehicle acquired by the camera and other acquisition apparatuses, the lane change sign is generated to update the subsequent positioning lane. For example, the lane change sign comprises lane change to the left and lane change to the right.

In some embodiments, the determining whether the vehicle changes lanes according to the road information sensed by the vehicle, and generating the lane change sign after determining that the vehicle changes lanes in S150 comprises:

determining that the vehicle changes lanes when a distance between at least one lane line in the road information sensed by the vehicle and the current vehicle jumps; and
generating the lane change sign according to a lane line change direction in the road information sensed by the vehicle.

Figure 11:
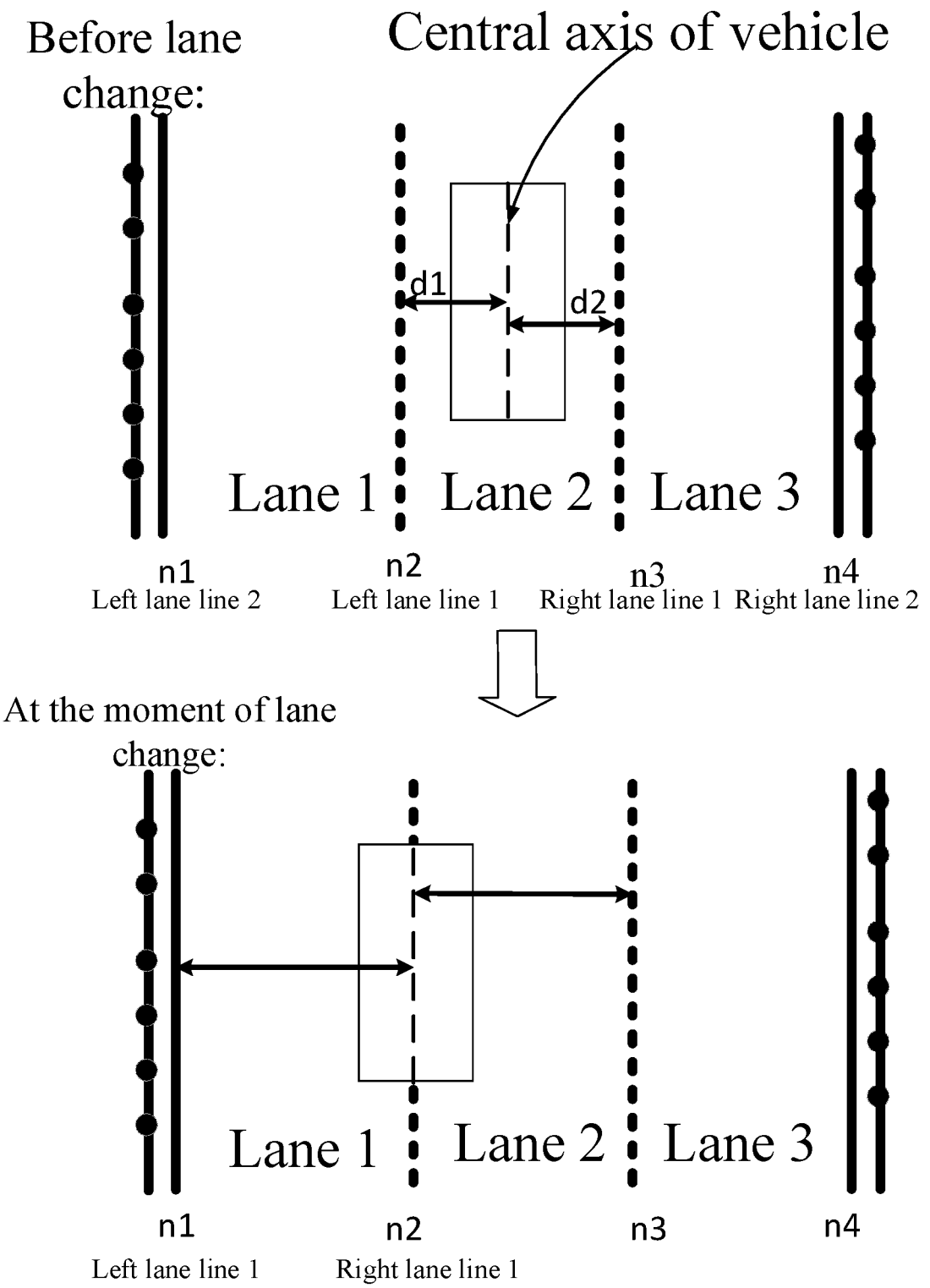
FIG. 11 is a schematic diagram of vehicle lane change provided by the embodiments of the present disclosure.

FIG. 11 is a schematic diagram of vehicle lane change provided by the embodiments of the present disclosure. As shown in FIG. 11, taking three lanes for example, the lane lines are represented as n1, n2, n3 and n4 in turn from left to right. At the previous moment, the vehicle is in lane 2, the left lane line 1 of the vehicle is n2 and the right lane line 1 of the vehicle is n3. The vehicle gradually changes lanes from lane 2 to lane 1.

Before the lane change, the left lane line 1 of the vehicle is n2, the left lane line 2 of the vehicle is n1, the right lane line 1 of the vehicle is n3, and the right lane line 2 of the vehicle is n4. A distance between the lane line and the vehicle as a distance between the lane line and a central axis of the vehicle is taken as an example to introduce in detail below. When the vehicle changes lanes to the lane 1, the vehicle gradually approaches to the lane line n2. For example, a distance d1 between the left lane line 1 n2 and the central axis of the vehicle gradually decreases from 1.7 m to 0. At the same time, a distance d2 between the right lane line 1 n3 and the central axis of the vehicle gradually decreases from −1.7 m to −3.4 m. At the moment when the central axis of the vehicle crosses the lane line n2, n1 becomes the left lane line 1 and n2 becomes the right lane line 1 (the left lane line 1 before the lane change). At the moment of the lane change, the distance between the left lane line 1 and the central axis of the vehicle jumps from d1=0 m to d3=3.4 m, and the distance between the right lane line 1 and the central axis of the vehicle jumps from d2=−3.4 m to d4=0 m. When the distance between at least one lane line in the road information sensed by the vehicle and the current vehicle jumps, it means that the vehicle changes lanes. As shown in FIG. 11, a conductor of a vehicle 2 on the left becomes the left lane line 1, indicating that the vehicle changes lanes to the left, thus generating a lane change sign for changing lanes to the left.

In the embodiment, it may be determined that the vehicle changes lanes when the distance between the lane lines at left and right sides in the road information sensed by the vehicle and the current vehicle jumps. In other embodiments, in order to prevent an asynchronous signal transmission problem in a signal acquisition process, it is also possible to determine that the vehicle changes lanes when the distance between at least one lane line in the road information sensed by the vehicle and the current vehicle jumps.

S160: updating the current positioning-established lane on the basis of the map information and the lane change sign.

During lane change monitoring, the current positioning-established lane is updated in real time on the basis of the map information and the lane change sign. The map information comprises, for example, information such as the total number of lanes where the vehicle is located. Still taking FIG. 11 as an example, the current positioning-established lane determined at the previous moment is lane 2. During lane change monitoring, it is found that the vehicle changes lanes to the left, so the current positioning-established lane is updated to lane 1.

When the vehicle is found to change lanes to the right, the current positioning-established lane is updated to lane 2. When the vehicle does not change lanes, the current positioning-established lane is kept unchanged.

Taking FIG. 11 as an example, in this process, when it is found that n lanes are added to the left side of the current positioning-established lane of the vehicle according to the map information, the current positioning-established lane is added with n. When n lanes are reduced on the left side, the current positioning-established lane is subtracted by n. When it is found that the total number of lanes is unchanged according to the map information, the current positioning-established lane is unchanged. The increase or decrease of the right lane number of the current positioning-established lane does not affect the result of the current positioning-established lane. It should be noted that the exemplary lane number in FIG. 11 increases from left to right in turn, which is not a limitation to the embodiments of the present invention. In other embodiments, as shown in FIG. 3, the lane number may also be set to increase from right to left. If the lane number is named as shown in FIG. 3, then when it is found from the map information that n lanes are added to the right side of the current positioning-established lane of the vehicle, the current positioning-established lane is added with n. When n lanes are reduced on the right side, the current positioning-established lane is subtracted by n. When it is found that the total number of lanes is unchanged according to the map information, the current positioning-established lane is unchanged. The increase or decrease of the left side lane number of the current positioning-established lane does not affect the result of the current positioning-established lane. In addition, this embodiment does not limit the naming order of the serial numbers of the lane lines.

In some embodiments, a generation time of two adjacent lane change signs is at least separated by a second preset time.

Because it takes a certain time for the vehicle to change lanes normally, for example, 5 seconds, when the distance between the lane line and the current vehicle is detected to jump frequently within 5 seconds, it may be that the acquisition apparatus has a sensing error or a processing error. For example, in an ideal state, the left lane line 1 of the vehicle jumps into the left lane line 2 at the previous moment, and meanwhile, the right lane line 1 jumps into the left lane line 1. When the camera collects the sensed lane line information, information of the left lane line 1 and the right lane line 1 is generally transmitted respectively through two messages, and the two messages may be received in sequence. In some cases, one message may be received and the other message is not updated, so there may be a short time interval between the left side lane line jump and the right side lane line jump. At this time, it may be considered as the lane changes twice. Therefore, in this embodiment, in order to avoid misjudgment, the generation time of the two adjacent lane change signs is set to be at least separated by the second preset time.

It should be noted that the acquisition of the road information sensed by the vehicle acquired by the acquisition apparatus in the vehicle comprises but is not limited to the following solutions:

1. A forward-looking camera can identify the nearest lane line information on the left side and the nearest lane line information on the right side of the vehicle, and a forward-looking millimeter-wave radar can acquire position information of more than 10 reflection points of a guardrail within 5 meters in front of the vehicle.

2. The forward-looking camera can identify the nearest lane line information on the left side and the nearest lane line information on the right side of the vehicle, and can acquire road boundary information within 5 meters on the left and right.

3. The forward-looking camera can identify the nearest lane information on the left side and the nearest lane information on the right side of the vehicle, the second lane information on the left side and the second lane information on the right side of the vehicle, and can obtain road boundary information within 7 meters on the left and right.

4. The forward-looking camera can identify the nearest lane information on the left side and the nearest lane information on the right side of the vehicle as well as the second lane information on the left side and the second lane information on the right side of the vehicle, and the forward-looking millimeter-wave radar may acquire position information of more than 10 reflection points of a guardrail within 7 meters in front of the vehicle.

Solution 1 and solution 2 can support the initial positioning of any lane of a three-lane road, the initial positioning of lanes on both sides of a road with more than four lanes, and the stable positioning and tracking of lanes within five lanes.

Solution 3 and solution 4 can support the initial positioning of any lane of a five-lane road, the initial positioning of lanes on both sides of a road with more than six lanes, and the stable positioning and tracking of the number of lanes within seven lanes.

The embodiments of the present disclosure can select appropriate acquisition apparatuses such as the forward-looking camera and the forward-looking millimeter-wave radar according to the actual situations, so as to meet the positioning requirements.

Figure 12:
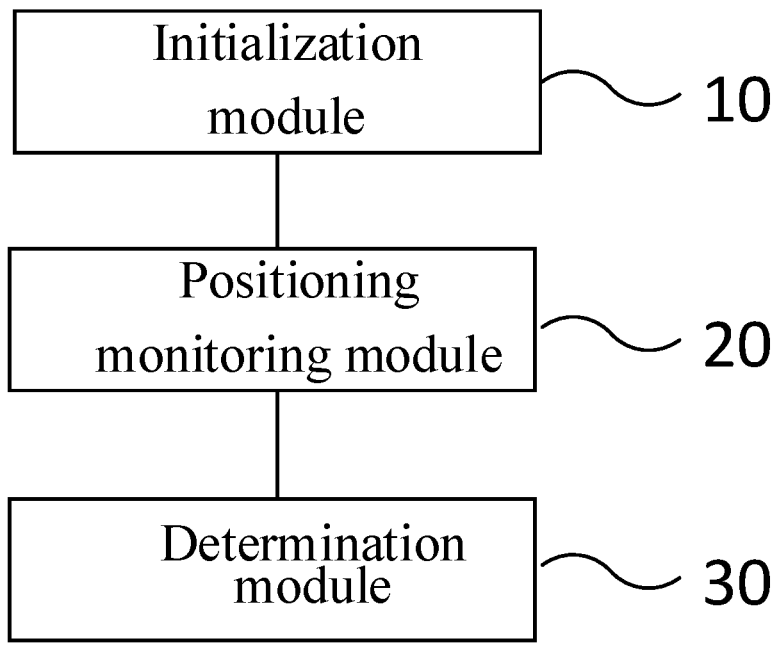
FIG. 12 is a structural block diagram of a vehicle positioning apparatus provided by the embodiments of the present disclosure.

Based on the same inventive concept, the embodiments of the present disclosure also provide a vehicle positioning apparatus. FIG. 12 is a structural block diagram of the vehicle positioning apparatus provided by the embodiments of the present disclosure. As shown in FIG. 12, the vehicle positioning apparatus comprises:

an initialization module 10 used for determining a current positioning-established lane on the basis of current position information of a vehicle, road information sensed by the vehicle and map information;

a positioning monitoring module 20 used for comparing the road information sensed by the vehicle acquired in real time with the current positioning-established lane to determine a mismatch integral value; and a determination module 30 used for determining whether the mismatch integral value is greater than or equal to a preset integral value, and when the mismatch integral value is greater than or equal to the preset integral value, instructing the initialization module to execute the operation of determining the current positioning-established lane on the basis of the current position information of the vehicle, the road information sensed by the vehicle and the map information again.

Figure 13:
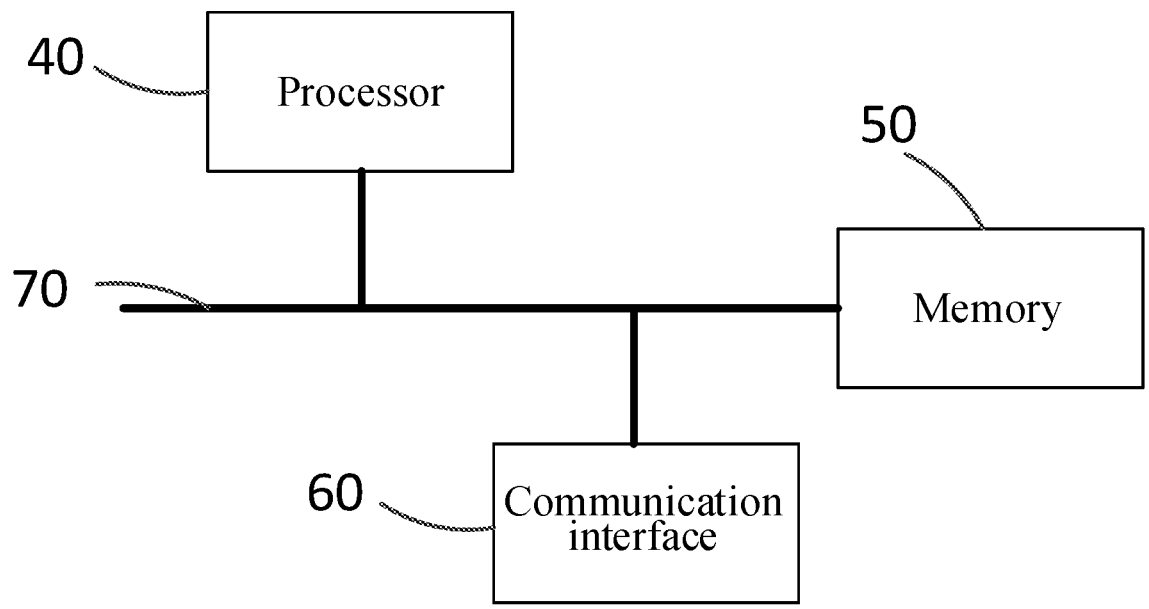
FIG. 13 is a structural schematic diagram of an electronic device provided by the embodiments of the present disclosure.

FIG. 13 is a schematic structural diagram of an electronic device provided by the embodiments of the present disclosure, comprising: a processor 40 and a memory 50. The processor 40 is configured for executing the steps of the vehicle positioning method according to any of the embodiments above by calling a program or instruction stored in the memory 50. In addition, the electronic device may further comprise at least one communication interface 60. Various components in the electronic device are coupled together through a bus system 70. The communication interface 60 is used for information transfer with external devices. It can be understood that the bus system 70 is configured to realize communications between these components. The bus system 70 further comprises a power bus, a control bus, and a status signal bus in addition to a data bus.

The vehicle positioning method provided in the embodiments of the present disclosure may be applied to a processor 40 or implemented by the processor 40. The processor 40 may be an integrated circuit chip with a signal processing capacity. In an implementation process, the steps in the foregoing methods may be completed by the processor 40 calling an integrated logic circuit of hardware or an instruction in a form of software in the program or instruction stored in the memory 50. The processor 40 may be a general purpose processor, a Digital Signal Processor (DSP), an Application Specific Integrated Circuit (ASIC), a Field Programmable Gate Array (FPGA) or other programmable logic device, a discrete gate, or a transistor logic device, and a discrete hardware assembly. The general-purpose processor may be a microprocessor or the processor may be any conventional processor, or the like.

The embodiments of the present disclosure also provide a computer readable storage medium, the computer readable storage medium stores a program or an instruction, and the program or instruction causes a computer to execute the steps of the various embodiments of the vehicle positioning method, which will not be repeated here to avoid repeated descriptions.

The present application discloses a vehicle positioning method, comprising:
A1: determining a current positioning-established lane on the basis of current position information of a vehicle, road information sensed by the vehicle and map information;
  comparing the road information sensed by the vehicle acquired in real time with the current positioning-established lane to determine a mismatch integral value; and
  after determining that the mismatch integral value is greater than or equal to a preset integral value, returning to execute the operation of determining the current positioning-established lane on the basis of the current position information of the vehicle, the road information sensed by the vehicle and the map information.
A2: the vehicle positioning method according to A1, further comprises:
  after determining that the mismatch integral value is less than the preset integral value, determining whether the vehicle is in a steering state;
  after determining that the vehicle is in the steering state, determining whether the vehicle changes lanes according to the road information sensed by the vehicle, and generating a lane change sign after determining that the vehicle changes lanes; and
  updating the current positioning-established lane on the basis of the map information and the lane change sign.
A3: in the vehicle positioning method according to A1, the determining the current positioning-established lane on the basis of the current position information of the vehicle, the road information sensed by the vehicle and the map information further comprises:
  generating a lane integral table on the basis of the current position information of the vehicle and the map information;
  determining an integral value of each lane in the lane integral table on the basis of the road information sensed by the vehicle; and
  determining a lane with an integral value greater than a first preset value in the lane integral table as the positioning-established lane.
A4: in the vehicle positioning method according to A3, the road information sensed by the vehicle comprises sensed lane line information and sensed guardrail information; and the determining the integral value of each lane in the lane integral table on the basis of the road information sensed by the vehicle comprises:
  determining a number of lanes in the map information corresponding to the current position information of the vehicle, and determining the integral value of each lane in the lane integral table on the basis of first integration rules corresponding to the number of lanes, the sensed lane line information and the sensed guardrail information.
A5: in the vehicle positioning method according to A4, the first integration rule corresponding to the number of lanes being one is: when the road information sensed by the vehicle is that a lane line on one side is a full line, and a guardrail is provided on a left side, adding point to the single lane located;
  the first integration rule corresponding to the number of lanes being two is: when the sensed lane line information and the sensed guardrail information are that a left nearest lane line is a full line and a right nearest lane line is a dotted line, adding point to the left side lane; when the sensed lane line information and the sensed guardrail information are that a guardrail is provided on the left side, while the right nearest lane line is a dotted line and no guardrail is provided on the right side, adding point to the leftmost side lane; when the sensed lane line information and the sensed guardrail information are that the right nearest lane line is a full line and the left nearest lane line is a dotted line, adding point to the right side lane; and when the sensed lane line information and the sensed guardrail information are that a guardrail is provided on the right side and the left nearest lane line is a dotted line, adding point to the right side lane; and
  the first integration rule corresponding to the number of lanes being three is: when the sensed lane line information and the sensed guardrail information are that a left nearest lane line and a right nearest lane line are both a dotted line without a guardrail, adding point to a middle lane; when the sensed lane line information and the sensed guardrail information are that the left nearest lane line is a full line, while the right nearest lane line is a dotted line and no guardrail is provided on the right side, adding point to the left side lane; when the sensed lane line information and the sensed guardrail information are that a guardrail is provided on the left side, while the right nearest lane line is a dotted line and no guardrail is provided on the right side, adding point to the left side lane; and when the sensed lane line information and the sensed guardrail information are that the right nearest lane line is a full line, while the left nearest lane line is a dotted line and no guardrail is provided on the left side, adding point to the right side lane.

A6: in the vehicle positioning method according to A4, the first integration rule corresponding to the number of lanes being greater than or equal to four is: when the sensed lane line information and the sensed guardrail information are that a left nearest lane line is a full line, while a right nearest lane line is a dotted line and no guardrail is provided on the right side, adding point to the leftmost side lane; when the sensed lane line information and the sensed guardrail information are that a guardrail is provided on the left side, while the right nearest lane line is a dotted line and no guardrail is provided on the right side, adding point to the leftmost side lane; when the sensed lane line information and the sensed guardrail information are that the right nearest lane line is a full line, while the left nearest lane line is a dotted line and no guardrail is provided on the left side, adding point to the rightmost side lane; and when the sensed lane line information and the sensed guardrail information are that the left nearest lane line and the right nearest lane line are both a dotted line without a guardrail, comparing the sensed lane line information and the sensed guardrail information with a lane line of each lane in the middle, and adding point to the middle lane in accordance with the comparison.

A7: In the vehicle positioning method according to claim A4, the road information sensed by the vehicle further comprises surrounding vehicle information, and after the determining the number of lanes in the map information corresponding to the current position information of the vehicle, and determining the integral value of each lane in the lane integral table on the basis of the first integration rules corresponding to the number of lanes, the sensed lane line information and the sensed guardrail information, the method further comprises:
updating the integral value of each lane in the lane integral table on the basis of second integration rules corresponding to the number of lanes and the surrounding vehicle information.

A8: in the vehicle positioning method according to A7, the second integration rule corresponding to the number of lanes being two is: when the surrounding vehicle information is that a moving vehicle is identified on a left side and a lateral distance between the moving vehicle and the current vehicle is greater than a second preset value, adding point to the right side lane; and when the surrounding vehicle information is that a moving vehicle is identified on a right side and a lateral distance between the moving vehicle and the current vehicle is greater than the second preset value, adding point to the left side lane; and
the second integration rule corresponding to the number of lanes being greater than or equal to three is: when the surrounding vehicle information is that a moving vehicle is identified on a left side and a lateral distance between the moving vehicle and the current vehicle is greater than the second preset value, deducting point from the leftmost side lane; when the surrounding vehicle information is that a moving vehicle is identified on a right side and a lateral distance between the moving vehicle and the current vehicle is greater than the second preset value, deducting point from the rightmost side lane; and when the number of lanes is equal to three, the surrounding vehicle information is that moving vehicles are identified on both left and right sides and the lateral distance between the moving vehicles and the current vehicle is greater than the second preset value, adding point to the middle lane.

A9: in the vehicle positioning method according to A7, after determining through the surrounding vehicle information that a duration of the lateral distance between the moving vehicle and the current vehicle being greater than the second preset value is greater than a first preset time, the operation of updating the integral value of each lane in the lane integral table on the basis of the second integration rules corresponding to the number of lanes and the surrounding vehicle information is executed.

A10: in the vehicle positioning method according to A3, in the process of determining the current positioning-established lane on the basis of the current position information of the vehicle, the road information sensed by the vehicle and the map information, the method further comprises:
after determining that the current number of lanes changes, clearing the lane integral table.

A11: in the vehicle positioning method according to A1, the comparing the road information sensed by the vehicle acquired in real time with the current positioning-established lane to determine the mismatch integral value comprises:
determining the mismatch integral value on the basis of third integration rules corresponding to the current positioning-established lane and the road information sensed by the vehicle acquired in real time.

A12: in the vehicle positioning method according to A11, the third integration rule corresponding to the current positioning-established lane which is a leftmost side lane is: when the road information sensed by the vehicle acquired in real time is that a left nearest lane line is a dotted line and no guardrail is provided on a left side, increasing the mismatch integral value; and when the road information sensed by the vehicle acquired in real time is that a guardrail is provided on a right side, and a total number of lanes is greater than one, increasing the mismatch integral value;
the third integration rule corresponding to the current positioning-established lane which is a rightmost side lane is: when the road information sensed by the vehicle acquired in real time is that a right nearest lane line is a dotted line and no guardrail is provided on a right side, increasing the mismatch integral value; and when the road information sensed by the vehicle acquired in real time is that a guardrail is provided on a left side, and a total number of lanes is greater than one, increasing the mismatch integral value; and
the third integration rule corresponding to the current positioning-established lane which is a middle lane is: when the road information sensed by the vehicle acquired in real time is that a distance between a second lane line in the left side and the current vehicle is less than a first threshold, and the second lane line is a full line, increasing the mismatch integral value; when the road information sensed by the vehicle acquired in real time is that a distance between a second lane line in the right side and the current vehicle is less than the first threshold, and the second lane line in the right side is a full line, increasing the mismatch integral value; when the road information sensed by the vehicle acquired in real time is that a guardrail is provided on the left side and a distance between the guardrail and the current vehicle is less than a second threshold, increasing the mismatch integral value; and when the road information sensed by the vehicle acquired in real time is that a guardrail is provided on the right side and a distance between the guardrail and the current vehicle is less than the second threshold, increasing the mismatch integral value.

A13: in the vehicle positioning method according to A12, after determining that the road information sensed by the vehicle acquired in real time is not in conformity with any of the third integration rules, the mismatch integral value is cleared.

A14: in the vehicle positioning method according to A2, the determining whether the vehicle is in the steering state comprises:
  determining whether the vehicle is in the steering state on the basis of a steering wheel angle and/or yaw velocity signal.

A15: in the vehicle positioning method according to A2, the determining whether the vehicle changes lanes according to the road information sensed by the vehicle, and generating the lane change sign after determining that the vehicle changes lanes comprises:
  determining that the vehicle changes lanes when a distance between at least one lane line in the road information sensed by the vehicle and the current vehicle jumps; and
  generating the lane change sign according to a lane line change direction in the road information sensed by the vehicle.

A16: in the vehicle positioning method according to A2, a generation time of two adjacent lane change signs is at least separated by a second preset time.

B1: a vehicle positioning apparatus, comprises:
  an initialization module used for determining a current positioning-established lane on the basis of current position information of a vehicle, road information sensed by the vehicle and map information;
  a positioning monitoring module used for comparing the road information sensed by the vehicle acquired in real time with the current positioning-established lane to determine a mismatch integral value; and
  a determination module used for determining whether the mismatch integral value is greater than or equal to a preset integral value, and when the mismatch integral value is greater than or equal to the preset integral value, instructing the initialization module to execute the operation of determining the current positioning-established lane on the basis of the current position information of the vehicle, the road information sensed by the vehicle and the map information again.

C1: an electronic device, comprises: a processor and a memory;
  the processor being configured for executing the steps of the method according to any one of A1 to A16 by calling a program or instruction stored in the memory.

D1: a computer readable storage medium stores a program or instruction, and the program or instruction enables a computer to execute the steps of the method according to any one of A1 to A16.

It should be noted that, for the sake of simple description, the foregoing method embodiments are all expressed as a series of action combinations, but those skilled in the art can understand that the embodiments of the present disclosure are not limited by the described action sequences, because certain steps may be performed in other sequences or concurrently according to the embodiments of the present application. Moreover, those skilled in the art can understand that the embodiments described in the specification are all optional embodiments.

It should be noted that the terms "including", "comprising" or any variations thereof are intended to embrace a non-exclusive inclusion, such that a process, a method, an article, or an apparatus including a series of elements, includes not only those elements but also includes other elements not expressly listed, or also includes elements inherent to such process, method, article, or apparatus. In the absence of further limitation, an element defined by the phrase "including a . . . " does not exclude the presence of additional identical element in the process, method, article, or device.

Those skilled in the art can understand that although some embodiments described herein include some features included in other embodiments rather than other features, but combinations of features of different embodiments are meant to be within the scope of the present disclosure and form different embodiments.

Those skilled in the art can understand that the description of each embodiment has its own emphasis. For parts not detailed in one embodiment, please refer to the related description of other embodiments.

Although the embodiments of the present disclosure have been described with reference to the drawings, those skilled in the art can make various modifications and variations without departing from the spirit and scope of the present disclosure, and such modifications and variations all fall within the scope defined by the appended claims.

INDUSTRIAL APPLICABILITY

According to the present disclosure, after the current positioning-established lane is determined according to the current position information of the vehicle, the road information sensed by the vehicle and the map information, whether the positioning-established lane is correct or not is continuously monitored by comparing the road information sensed by the vehicle acquired in real time with the current positioning-established lane to determine the mismatch integral value, so that the lane positioning stability and the interference prevention capability are improved, and the present disclosure has very strong industrial applicability.

What is claimed is:
1. A vehicle positioning method, comprising:
  specifying different comparison integration rules for different current positioning-established lanes;
  determining, by physically sensing, by the vehicle, initial road information with sensors of the vehicle, a current positioning-established lane on the basis of current position information of the vehicle, the initial road information sensed by the vehicle and map information, wherein the initial road information includes first physical features of the road;

comparing, by physically sensing and acquiring, by the vehicle with the sensors of the vehicle, road information, including second physical features of a road, in real time, the road information sensed by the vehicle acquired in real time with the current positioning-established lane to determine a mismatch integral value; the comparing the road information sensed by the vehicle acquired in real time with the current positioning-established lane to determine the mismatch integral value comprising: acquiring, in real time, the road information sensed by the vehicle acquired in real time and comparing the road information sensed by the vehicle acquired in real time with the current positioning-established lane to determine the mismatch integral value based on at least one of the different comparison integration rules; and after determining that the mismatch integral value is greater than or equal to a preset integral value, repeating said determining a current positioning-established lane to obtain an updated positioning-established lane.

2. The vehicle positioning method according to claim 1, further comprising:

repeating the comparing road information sensed by the vehicle acquired in real time to obtain an updated mismatch integral value;

after determining that the updated mismatch integral value is less than the preset integral value, determining whether the vehicle is in a steering state;

after determining that the vehicle is in the steering state, determining whether the vehicle changes lanes according to road information sensed by the vehicle, and generating a lane change sign after determining that the vehicle changes lanes; and further updating the updated positioning-established lane on the basis of the map information and the lane change sign.

3. The vehicle positioning method according to claim 1, wherein the determining a current positioning-established lane on the basis of the current position information of the vehicle, the initial road information sensed by the vehicle and the map information comprises:

generating a lane integral table on the basis of the current position information of the vehicle and the map information;

determining an integral value of each lane in the lane integral table on the basis of the initial road information sensed by the vehicle; and determining a lane with an integral value greater than a first preset value in the lane integral table as being the current positioning-established lane.

4. The vehicle positioning method according to claim 3, wherein the initial road information sensed by the vehicle comprises sensed lane line information and sensed guardrail information; and the determining the integral value of each lane in the lane integral table on the basis of the initial road information sensed by the vehicle comprises:

determining a number of lanes in the map information corresponding to the current position information of the vehicle, and determining the integral value of each lane in the lane integral table on the basis of at least one first integration rule, of said different comparison integration rules, corresponding to the number of lanes, the sensed lane line information and the sensed guardrail information.

5. The vehicle positioning method according to claim 4, wherein the at least one first integration rule is a plurality of first integration rules, and a first integration rule, of the plurality of first integration rules, corresponding to the number of lanes being one is: when the road information sensed by the vehicle is that a lane line on one side is a full line, and a guardrail is provided on a left side, add a point to a single lane located; and a first integration rule, of the plurality of first integration rules, corresponding to the number of lanes being two is: when the sensed lane line information and the sensed guardrail information are that a left nearest lane line is a full line and a right nearest lane line is a dotted line, add a point to a left side lane; when the sensed lane line information and the sensed guardrail information are that a guardrail is provided on the left side and the right nearest lane line is a dotted line, add a point to the left side lane; when the sensed lane line information and the sensed guardrail information are that the right nearest lane line is a full line and the left nearest lane line is a dotted line, add a point to a right side lane; and when the sensed lane line information and the sensed guardrail information are that a guardrail is provided on the right side and the left nearest lane line is a dotted line, add a point to the right side lane; and a first integration rule, of the plurality of first integration rules, corresponding to the number of lanes being three is: when the sensed lane line information and the sensed guardrail information are that a left nearest lane line and a right nearest lane line are both a dotted line without a guardrail, add a point to a middle lane; when the sensed lane line information and the sensed guardrail information are that the left nearest lane line is a full line, while the right nearest lane line is a dotted line and no guardrail is provided on the right side, add a point to the left side lane; when the sensed lane line information and the sensed guardrail information are that a guardrail is provided on the left side, while the right nearest lane line is a dotted line and no guardrail is provided on the right side, add a point to the left side lane; and when the sensed lane line information and the sensed guardrail information are that the right nearest lane line is a full line, while the left nearest lane line is a dotted line and no guardrail is provided on the left side, add a point to the right side lane.

6. The vehicle positioning method according to claim 4, wherein the at least one first integration rule is a plurality of first integration rules, and a first integration rule, of the plurality of first integration rules, corresponding to the number of lanes being greater than or equal to four is: when the sensed lane line information and the sensed guardrail information are that a left nearest lane line is a full line, while a right nearest lane line is a dotted line and no guardrail is provided on the right side, add a point to a leftmost side lane; when the sensed lane line information and the sensed guardrail information are that a guardrail is provided on the left side, while the right nearest lane line is a dotted line and no guardrail is provided on the right side, add a point to the leftmost side lane; when the sensed lane line information and the sensed guardrail information are that the right nearest lane line is a full line, while the left nearest lane line is a dotted line and no guardrail is provided on the left side, add a point to a rightmost side lane; and when the sensed lane line information and the sensed guardrail information are that the left nearest lane line and the right nearest lane line are both a dotted line without a guardrail, comparing the sensed lane line information and the sensed guardrail information with a lane line of each lane in the middle, and add a point to a middle lane in accordance with the comparison.

7. The vehicle positioning method according to claim 4, wherein the road information sensed by the vehicle further comprises surrounding vehicle information, and after the determining the number of lanes in the map information corresponding to the current position information of the vehicle, and determining the integral value of each lane in the lane integral table on the basis of the at least one first integration rule corresponding to the number of lanes, the sensed lane line information and the sensed guardrail information, the method further comprises:

updating the integral value of each lane in the lane integral table on the basis of at least one second integration rule, of said different comparison integration rules, corresponding to the number of lanes and the surrounding vehicle information.

8. The vehicle positioning method according to claim 7, wherein the at least one second integration rule is a plurality of second integration rules, the vehicle is a current vehicle, and a second integration rule, of the plurality of second integration rules, corresponding to the number of lanes being two is: when the surrounding vehicle information is that a moving vehicle is identified on a left side and a lateral distance between the moving vehicle and the current vehicle is greater than a second preset value, add a point to a right side lane; and when the surrounding vehicle information is that the moving vehicle is identified on a right side and a lateral distance between the moving vehicle and the current vehicle is greater than the second preset value, add a point to a left side lane; and a second integration rule, of the plurality of second integration rules, corresponding to the number of lanes being greater than or equal to three is: when the surrounding vehicle information is that the moving vehicle is identified on a left side and a lateral distance between the moving vehicle and the current vehicle is greater than the second preset value, deduct a point from a leftmost side lane; when the surrounding vehicle information is that the moving vehicle is identified on a right side and a lateral distance between the moving vehicle and the current vehicle is greater than the second preset value, deduct a point from a rightmost side lane; and when the number of lanes is equal to three, the surrounding vehicle information is that a plurality of moving vehicles are identified on both left and right sides and the lateral distance between the plurality of moving vehicles and the current vehicle is greater than the second preset value, add a point to a middle lane.

9. The vehicle positioning method according to claim 7, wherein the vehicle is a current vehicle and the method further comprises determining through the surrounding vehicle information that a duration of maintaining a lateral distance between a moving vehicle and the current vehicle being greater than a second preset value is greater than a first preset time prior to the updating the integral value of each lane in the lane integral table on the basis of the at least one second integration rule corresponding to the number of lanes and the surrounding vehicle information is executed.

10. The vehicle positioning method according to claim 3, wherein the process of determining a current positioning-established lane on the basis of the current position information of the vehicle, the road information sensed by the vehicle and the map information further comprises:

after determining that the current number of lanes changes, clearing the lane integral table.

11. The vehicle positioning method according to claim 1, wherein the comparing the road information sensed by the vehicle acquired in real time with the current positioning-established lane to determine the mismatch integral value comprises:

determining the mismatch integral value on the basis of at least one of a plurality of rules, of the different comparison integration rules, corresponding to the current positioning-established lane and the road information sensed by the vehicle acquired in real time;

an integration rule, of the plurality of rules, corresponding to the current positioning-established lane being a leftmost side lane, is: when the road information sensed by the vehicle acquired in real time is that a left nearest lane line is a dotted line and no guardrail is provided on a left side, increase e the mismatch integral value; and when the road information sensed by the vehicle acquired in real time is that a guardrail is provided on a right side, and a total number of lanes is greater than one, increase the mismatch integral value;

an integration rule, of the plurality of rules, corresponding to the current positioning-established lane being a rightmost side lane, is: when the road information sensed by the vehicle acquired in real time is that a right nearest lane line is a dotted line and no guardrail is provided on the right side, increase the mismatch integral value; and when the road information sensed by the vehicle acquired in real time is that a guardrail is provided on a left side, and a total number of lanes is greater than one, increase the mismatch integral value; and an integration rule, of the plurality of rules, corresponding to the current positioning-established lane being a middle lane, is: when the road information sensed by the vehicle acquired in real time is that a distance between a second lane line in the left side and the current vehicle is less than a first threshold, and the second lane line is a full line, increase the mismatch integral value; when the road information sensed by the vehicle acquired in real time is that a distance between a second lane line in the right side and the current vehicle is less than the first threshold, and the second lane line in the right side is a full line, increase the mismatch integral value; when the road information sensed by the vehicle acquired in real time is that a guardrail is provided on the left side and a distance between the guardrail and the current vehicle is less than a second threshold, increase the mismatch integral value; and when the road information sensed by the vehicle acquired in real time is that a guardrail is provided on the right side and a distance between the guardrail and the current vehicle is less than the second threshold, increase the mismatch integral value.

12. The vehicle positioning method according to claim 11, wherein after determining that the road information sensed by the vehicle acquired in real time is not in conformity with any of the plurality of integration rules, clearing the mismatch integral value.

13. The vehicle positioning method according to claim 2, wherein the determining whether the vehicle is in the steering state comprises:

determining whether the vehicle is in the steering state on the basis of a steering wheel angle and/or yaw velocity signal.

14. The vehicle positioning method according to claim 2, wherein:
- the determining whether the vehicle changes lanes according to road information sensed by the vehicle, and generating the lane change sign after determining that the vehicle changes lanes comprises:
- determining that the vehicle changes lanes in response to determining that a distance between at least one lane line in the road information sensed by the vehicle, according to which whether the vehicle changes lanes is determined, and the current vehicle changes; and
- generating the lane change sign according to a lane line change direction in the road information sensed by the vehicle according to which whether the vehicle changes lanes is determined.

15. The vehicle positioning method according to claim 2, wherein a generation time of two adjacent lane change signs is at least separated by a second preset time.

16. An electronic device, comprising: a processor and a memory;
- the processor being configured for performing the method according to claim 1 by executing a program of instructions stored in the memory.

17. A computer readable storage medium, wherein a program of instructions is stored on the computer readable storage medium, and the program of instructions, when executed by a computer, causes the computer perform the method according to claim 1.

18. The electronic device according to claim 16, wherein the vehicle positioning method further comprises:
- repeating the comparing road information sensed by the vehicle acquired in real time to obtain an updated mismatch integral value;
- after determining that the updated mismatch integral value is less than the preset integral value, determining whether the vehicle is in a steering state;
- after determining that the vehicle is in the steering state, determining whether the vehicle changes lanes according to the road information sensed by the vehicle, and generating a lane change sign after determining that the vehicle changes lanes; and
- further updating the updated positioning-established lane on the basis of the map information and the lane change sign.

19. The electronic device according to claim 16, wherein in the vehicle positioning method, a determining the current positioning-established lane on the basis of the current position information of the vehicle, the road information sensed by the vehicle and the map information comprises:
- generating a lane integral table on the basis of the current position information of the vehicle and the map information;
- determining an integral value of each lane in the lane integral table on the basis of the road information sensed by the vehicle; and
- determining a lane with an integral value greater than a first preset value in the lane integral table as being the current positioning-established lane.

20. The vehicle positioning method according to claim 1, further comprising:
- autonomously driving the vehicle based on the updated positioning established lane.

* * * * *